(12) United States Patent
Evanchik et al.

(10) Patent No.: US 8,588,400 B2
(45) Date of Patent: *Nov. 19, 2013

(54) CATEGORY BASED ORGANIZATION AND MONITORING OF CUSTOMER SERVICE HELP SESSIONS

(75) Inventors: Stephen A. Evanchik, Melrose, MA (US); Alister D. Lewis-Bowen, Cambridge, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 1477 days.

This patent is subject to a terminal disclaimer.

(21) Appl. No.: 12/035,279

(22) Filed: Feb. 21, 2008

(65) Prior Publication Data

US 2009/0214020 A1 Aug. 27, 2009

(51) Int. Cl.
*H04M 3/00* (2006.01)

(52) U.S. Cl.
USPC .................................. 379/265.12; 379/265.04

(58) Field of Classification Search
USPC ............. 379/265.01, 265.02, 265.09, 265.11, 379/265.12, 265.13, 266.01, 266.02, 266.04
See application file for complete search history.

(56) References Cited

U.S. PATENT DOCUMENTS

| | | | |
|---|---|---|---|
| 6,230,287 B1 | 5/2001 | Pinard et al. | |
| 6,404,747 B1 | 6/2002 | Berry et al. | |
| 6,408,066 B1 * | 6/2002 | Andruska et al. | 379/265.12 |
| 6,510,220 B1 | 1/2003 | Beckett, II et al. | |
| 6,553,114 B1 | 4/2003 | Fisher et al. | |
| 6,577,605 B1 * | 6/2003 | Dagate et al. | 370/270 |
| 6,665,395 B1 | 12/2003 | Busey et al. | |
| 6,981,020 B2 | 12/2005 | Miloslavsky et al. | |
| 7,023,979 B1 | 4/2006 | Wu et al. | |
| 7,043,004 B1 | 5/2006 | Khuc et al. | |
| 7,895,330 B2 * | 2/2011 | Evanchik et al. | 709/226 |
| 2002/0087648 A1 | 7/2002 | Petrovykh | |
| 2003/0043179 A1 | 3/2003 | Gusler et al. | |
| 2003/0108183 A1 | 6/2003 | Dhir et al. | |
| 2004/0093230 A1 | 5/2004 | Deogard | |
| 2005/0086290 A1 * | 4/2005 | Joyce et al. | 709/202 |
| 2006/0075029 A1 | 4/2006 | Kelso et al. | |
| 2006/0233349 A1 | 10/2006 | Cooper | |
| 2006/0256953 A1 | 11/2006 | Pulaski et al. | |
| 2006/0256954 A1 | 11/2006 | Patel et al. | |
| 2007/0116185 A1 | 5/2007 | Savoor et al. | |
| 2007/0129996 A1 | 6/2007 | Babine et al. | |

OTHER PUBLICATIONS

Non-Final Office Action dated Dec. 4, 2009 received for U.S. Appl. No. 11/551,278.

(Continued)

*Primary Examiner* — Antim Shah

(74) *Attorney, Agent, or Firm* — Fleit Gibbons Gutman Bongini & Bianco PL; Thomas Grzesik; Jose Gutman

(57) ABSTRACT

A method and computer readable medium are provided for monitoring customer support sessions based on at least one category associated with the customer support sessions. A request from an administrator for information associated with unresolved support sessions is received. A set of support categories is presented to the administrator. A selection of at least one support category is received from the administrator. A set of first level customer support agent identifiers associated with at least one support session queued under the at least one support category which has been selected is presented to the administrator.

8 Claims, 7 Drawing Sheets

(56) References Cited

OTHER PUBLICATIONS

Non-Final Office Action dated May 11, 2010 received for U.S. Appl. No. 11/551,278.

Non-Final Office Action dated Feb. 12, 2009 received for U.S. Appl. No. 11/551,278.

Final Office Action dated Jun. 29, 2009 received for U.S. Appl. No. 11/551,278.

* cited by examiner

CATEGORY BASED ORGANIZATION AND MONITORING OF CUSTOMER SERVICE HELP SESSIONS

FIELD OF THE INVENTION

The present invention generally relates to the field of customer service call centers, and more particularly relates to monitoring and organizing customer service help sessions.

BACKGROUND OF THE INVENTION

Customer service support is an important aspect of businesses that provide products and services to consumers. In many instances customer service support environments comprise various levels of support, which are usually referred to as tiers. Each tier generally comprises a certain level of expertise in a field. If a lower level tier agent is unable to answer a customer's question the agent usually contacts a next-tier agent. One problem with current customer service support environments is that an efficient system for managing and organizing help sessions between customers and first tier agents and first tier agents and higher-tiered agents does not exist. A lower tier agent may have to contact multiple higher tier agents to answer a customer's question. This can greatly increase the time a customer has to wait before he/she receives an answer, thereby causing the customer to have a poor customer service experience.

Therefore a need exists to overcome the problems with the prior art as discussed above.

SUMMARY OF THE INVENTION

Briefly, in accordance with the present invention, disclosed is a method for monitoring customer support sessions based on at least one category associated with the customer support sessions. The method includes receiving a request from an administrator for information associated with unresolved support sessions. A set of support categories is presented to the administrator. A selection of at least one support category is received from the administrator. A set of first level customer support agent identifiers associated with at least one support session queued under the at least one support category which has been selected is presented to the administrator.

In another embodiment, a method for monitoring and organizing customer support session based on categories is disclosed. The method includes receiving, by at least one first level customer support agent, a help request from a customer. A support session is established by the at least one first level customer support agent with the customer in response to the receiving. A second level customer support agent is determined by the at least one first level customer support agent to be required to resolve the help request. At least one support category is assigned to the support session by the at least one first level customer support agent based on a support context of the support session. The support session is placed into at least one support queue for selection by at least one second level customer support agent based on the at least one support category assigned to the support session.

In yet another embodiment, a computer readable medium for monitoring customer support sessions based on at least one category associated with the customer support sessions is disclosed. The computer readable medium includes instructions for receiving a request from an administrator for information associated with unresolved support sessions. A set of support categories is presented to the administrator. A selection of at least one support category is received from the administrator. A set of first level customer support agent identifiers associated with at least one support session queued under the at least one support category which has been selected is presented to the administrator.

An advantage of various embodiments of the present invention is that a system for organizing and monitoring customer help sessions based on categories associated with the help sessions is provided. The various embodiments can automatically assign and/or allow an operator to assign categories to a help session based on the context of the help session. These categories are used to place help sessions in appropriate queues for further support by customer service support experts. The various embodiments of the present invention also allow an administrator to manage and monitor the various help sessions between an operator and an expert to further provide an efficient and advantageous customer support system.

Another advantage is that customer support centers are able to utilize a call management mechanism to help support first tier agents with expertise through an instant messaging environment. Providing timely information to the first line agent reduces the time the first tier agents need to spend interacting with the customers. This helps provide better customer satisfaction with quick answers to a wide range of questions that the agent may not be familiar with and reduces the number of agents the customer needs to speak to.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Customer Service Support Environment

Figure 1:
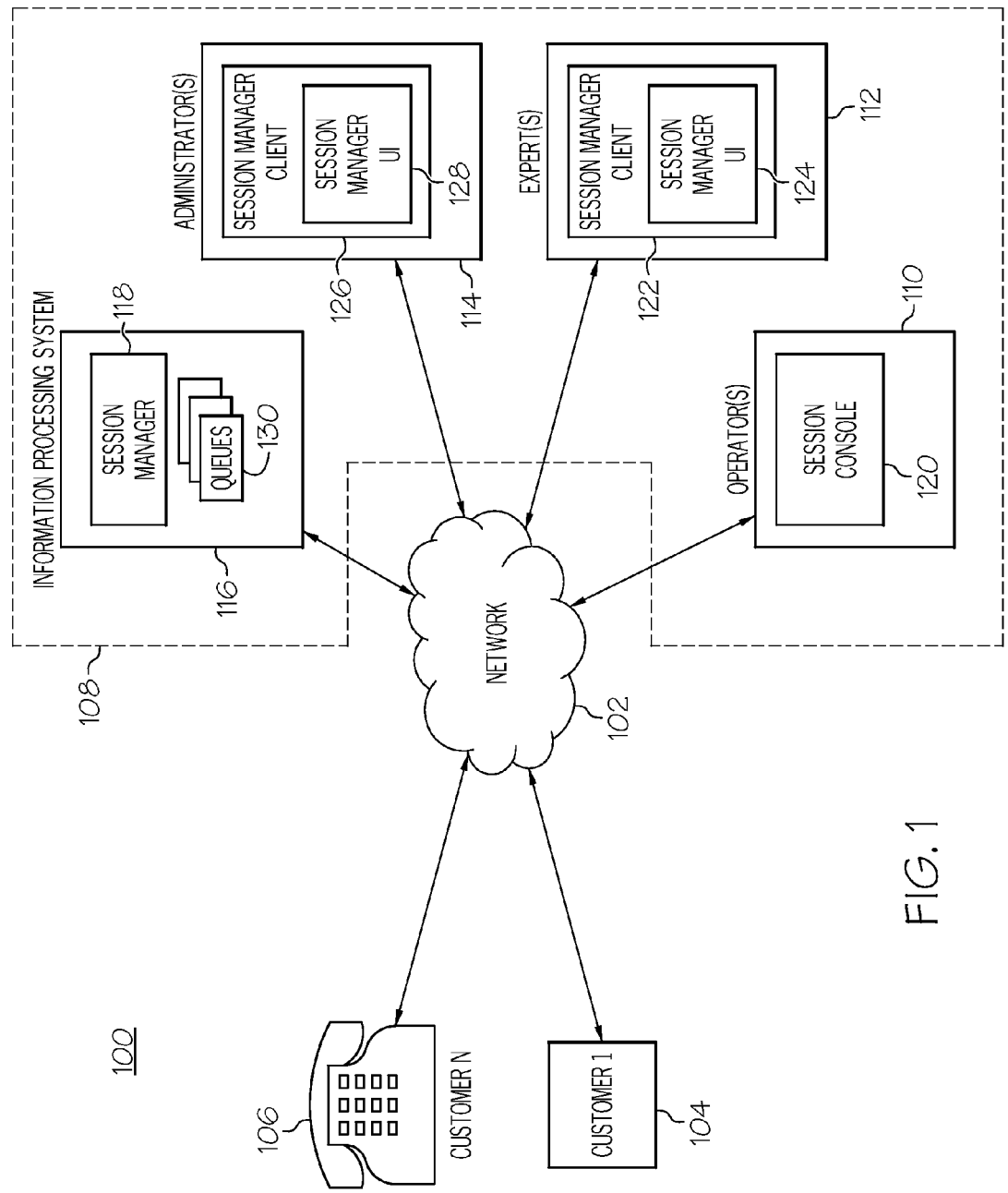
FIG. 1 is block diagram illustrating a customer service help environment, according to one embodiment of the present invention.

According to one embodiment of the present invention as shown in FIG. 1 a customer service support environment 100 is illustrated. The customer service support environment 100 provides help-desk solutions to customers. In one embodiment, the environment 100 comprises a network 102. The network 102 can include any wireless or wired networking technologies. One or more customers 104, 106 are communicatively coupled to the network 102 for communicating with a customer support center 108.

In one embodiment, a customer 104 communicates with a customer service operator 110 via instant messaging, landline telephone, IP-based telephone, text messaging, and other communication methods/devices. It should be noted that although the following discussion uses instant messaging as one example of a communication method, the present invention is not limited to such a method. For example, voice calls are a communication method applicable to at least some embodiments of the present invention. The customer service center 108, in one embodiment, includes one or more operators 110, experts 112, administrators 114, and information processing systems 116. An operator 110 includes a session console 120 that allows an operator to interact with a customer 104 and queue an open help session for expert 112 review. The functions of operator(s) 110 and the session console 120 are discussed in greater detail below.

An expert 112 includes a session manager client 122 and a session manager user interface 124 that allows the expert 112 to act upon an open help session associated with an operator, review past help sessions, and perform other actions with respect to help sessions. The expert 112, session manager 122, and session manager user interface 124 are discussed in greater detail below. In one embodiment, the customer service center 108 also includes one or more administrators 114. An administrator 114 manages the operators 110 and experts 112. In one embodiment, an administrator 114 can be a "super-expert" that can provide a higher tier of support than an operator 110 or an expert 112. An administrator 114 can also comprise a session manager client 126 and a session manager user interface 128, which are discussed in greater detail below.

The information processing system 116, in one embodiment, includes a session manager 118 that manages all past, present, and queued help sessions. The information processing system 116 also includes one or more session databases or queues 130 for managing past, present, and queued help sessions. Stated differently, the session manager 118 allows for category based organization and monitoring of customer service help sessions. The information processing system 116, session manager 118, and queues 130 are discussed in greater detail below.

Category Based Organization and Monitoring of Customer Service Help Sessions

Figure 2:
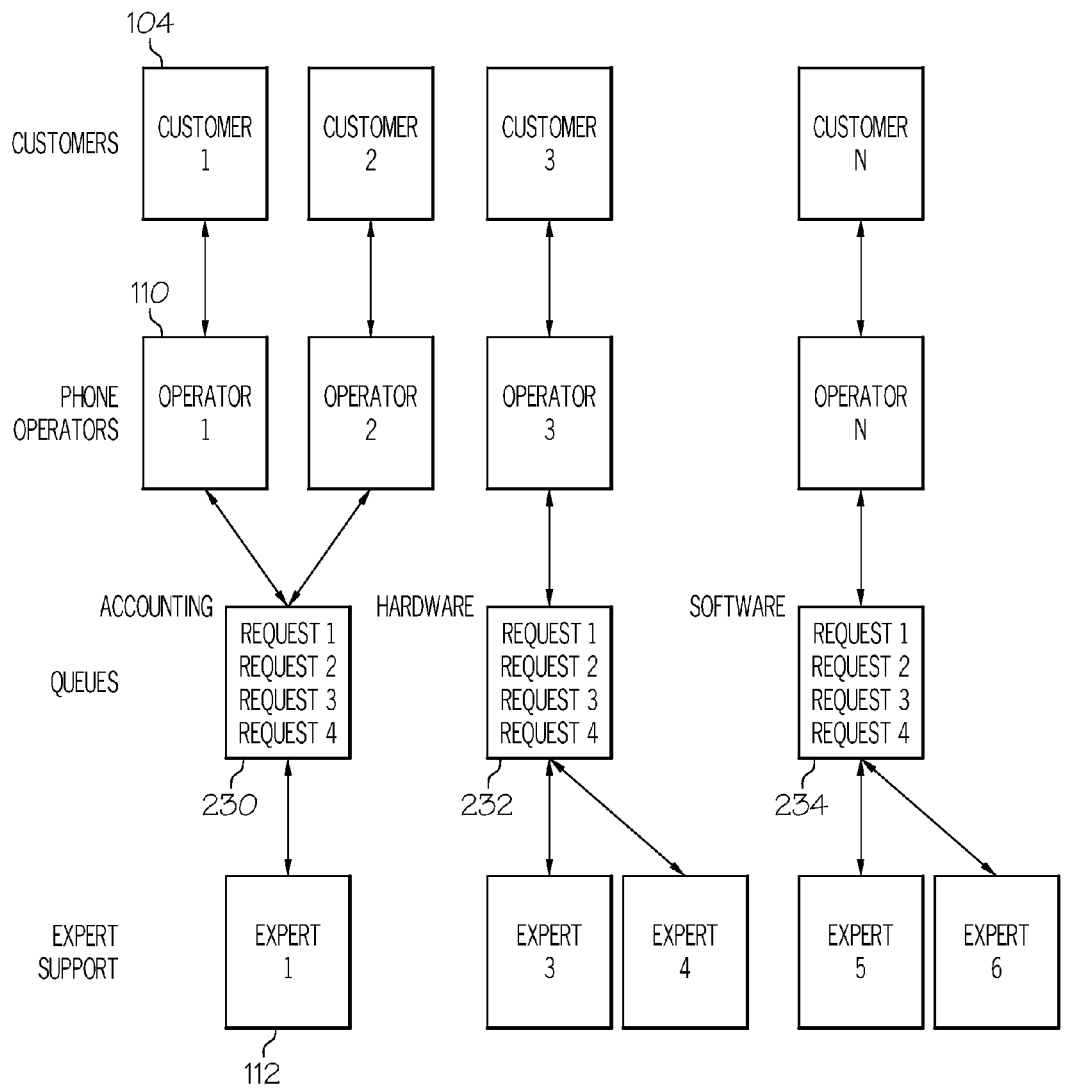
FIG. 2 is a block diagram illustrating various components of the customer service help environment of FIG. 1 according to one embodiment of the present invention.

FIG. 2 shows a block diagram illustrating a hierarchy of customers 104, operators 110, queues 130, and experts 112. In one embodiment, operators 110 are the first tier of support for a customer 104. For example, when a customer 104 initiates a customer service help session with the customer service center 108, the request is forwarded to an operator 110 via the session manager 118 of the information processing system 116. The operator 110 interacts with the customer 104 via a session console 120. For example, in an instant messaging environment the session console 120 allows an operator to send and receive instant messages to/from a customer 104. The session console 120 can also allow an operator 110 to query a problem/solution database to assist in trouble shooting the customer's problem.

Figure 3:
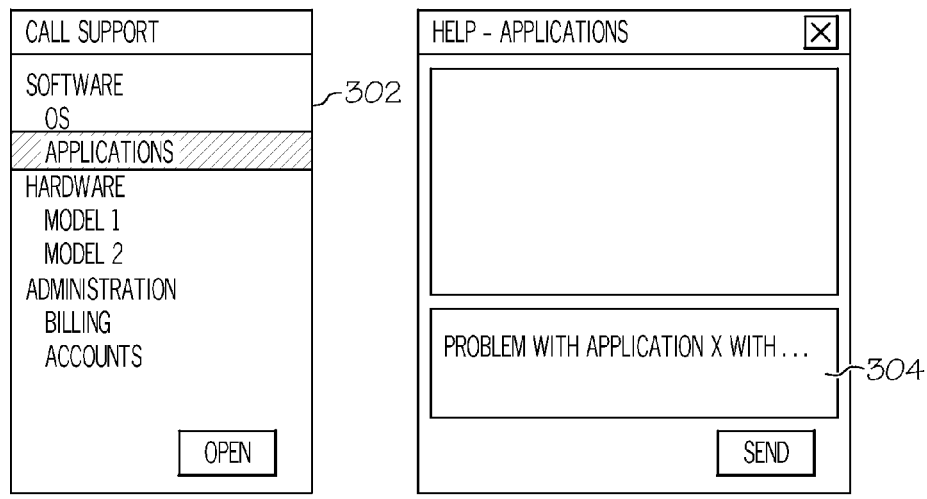
FIG. 3 is a block diagram illustrating a session console for an operator a customer service environment according to one embodiment of the present invention.

In one embodiment, if an operator 110 is unable to provide a solution to a customer's problem, the operator 110 can queue the help session for expert support via the session console 120. For example, FIG. 3 shows one aspect of the session console 120 at an operator 110. In the example of FIG. 3, a customer 104 is having a problem with an application. If the operator 110 is unable to help the customer 104, the operator 110 via the session console 120 categorizes the current help session in to one or more categories.

For example, FIG. 3 shows a window 302 that provides a plurality of categories that an operator 110 can select based on the context of the help session. In the current example, the operator 110 can select "Applications" under a "Software" category. The operator 110 can also further refine the category by selecting the actual application such as a category for "Application X". If a specific category does not exist, the operator 110 can be given the option of creating the particular category. In another embodiment, a category can automatically be selected by the session console 120 based on the context of the help session. For example, if an operator 110 determines that he/she is unable to help the customer 104, an option can be selected on the session console 120 that automatically queues the help session. The help session is parsed either by the session console 120 and/or session manager 118 to automatically determine/create one or more categories to be assigned to the current help session. It should be noted that more than one category can be assigned to a help session. For example, if a customer is having problems with billing software called "Billing Software X" the categories "Application/Billing Software X" and "Billing" can be assigned to the help session.

The operator 110 can also annotate the help session with a comment or remark in a chat window 304 of the session console 120. This window 304 also allows the operator 110 to communicate with an expert 112 regarding the current help session. Returning back to FIG. 2, once categories are assigned to a help session the help session is queued based on the assigned categories. For example, FIG. 2 shows a plurality of queues 230, 232, 234 each maintaining respective help sessions In this example, a first queue 230 can maintain help sessions associated with an "Accounting" category, a second queue 232 can maintain help sessions associated with a "Hardware" category, and a third queue can maintain help sessions associated with a "Software" category. It should be noted that these queues are only examples and the present invention is not limited to these specific queue types or number of queues. Also, the queues 230, 232, 234 are not limited to current open help sessions, each queue can maintain historical log of help sessions as well. Also, the queues 230, 232, 234 are not limited to being separate queues. For example, a master queue can comprise each of the queues 230, 232, 234.

The experts 112 and administrators 114, in one embodiment, are communicatively coupled to the queues 230, 232, 234 via the session manager client 120, 126. The session manager client 120, 126 interacts with the session manager 118 of the information processing system 116. The session manager 118, in one embodiment, maintains the queues, 230, 232, 234, monitors and manages help sessions, and performs other actions with respect to help sessions. The session manager client 120, 126 includes a session manager user interface 124, 128 that provides a graphical console for the expert/administrator 112, 114 to interact with.

An administrator 114 can manage all help sessions within the customer service center 108. Alternatively, an administrator can be assigned to (but not limited to) a particular category of help sessions, a particular group of operators 110 and/or experts 112. In one embodiment, administrators 114 are "super-experts" that provide one of the highest levels of customer support. For example, an operator 110 can be first tier support, an expert 112 can be second tier support, and an administrator 114 can be third tier support. It should be noted that an administrator 114 is not required to be support staff. For example, the administrator 114 may only manage operators 110 that have queued help sessions for expert 112 support.

Figure 4:
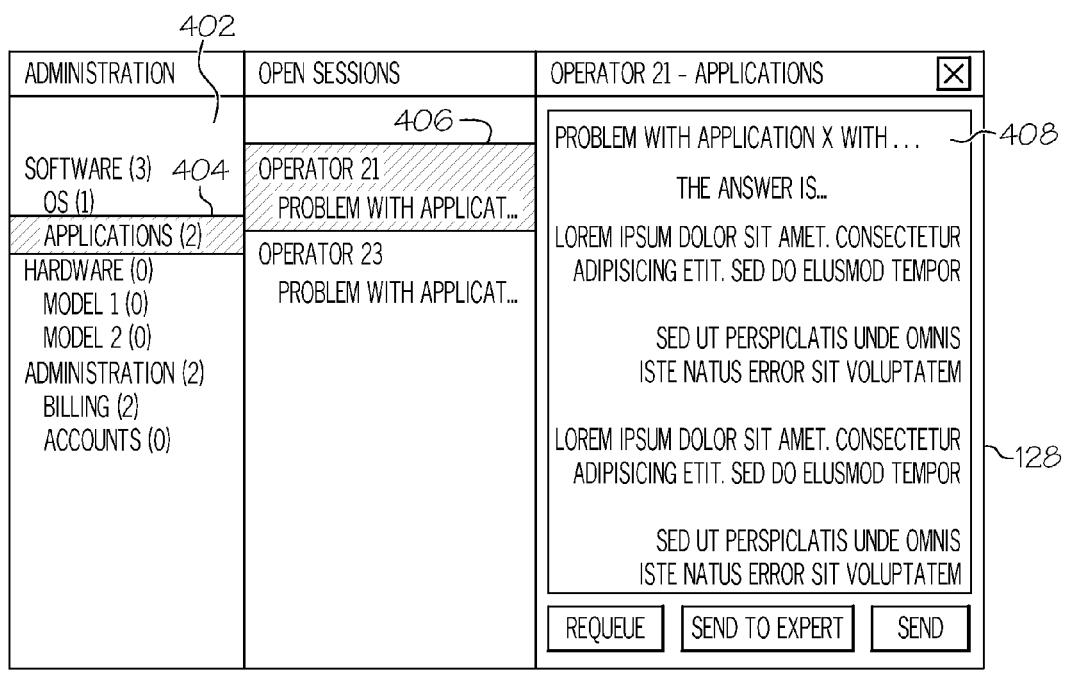
FIG. 4 is a block diagram illustrating a session manager user interface for administrators in a customer service environment according to one embodiment of the present invention.

FIG. 4 is a block diagram illustrating the session manager user interface 128 of an administrator 114. The user interface 128 of FIG. 4 shows a first window 402 comprising all of the queues/categories that the particular administrator 114 is managing such as "Hardware", "Software", "Administration" and any sub-queue or sub-category as well. An open session indicator 404 is given as to how many open sessions are queued within each category. In one embodiment, an "open session" shown within the user interface 128 of an administrator 114 is a help request from an operator 110 to an expert 112. For example, FIG. 4 shows that under the "Applications" category there are current two open sessions.

The administrator 114 can select any of the categories listed in the first window 404 to obtain additional information associated with the category and any open sessions. For example, FIG. 4 shows that the "Applications" category has been selected and information associated with that category is presented to the administrator 114 in a second window 406. In one embodiment, the second window 406 illustrates each operator 110 associated with an open help session under the selected category of the first window 402. In the current example, FIG. 4 shows that Operator 21 and Operator 23 each are requesting help from one or more experts 112. The administrator 114, in one embodiment, is able to select a particular operator 110 and be presented with one or more of the open help sessions associated with the selected operator 110.

For example, FIG. 4 shows that Operator 21 has been selected. A third window 408 presents the current conversation between Operator 21 and an expert(s) 112 to the administrator 114. As discussed above, an operator 110 may be communicating with an expert 112 to further troubleshoot a customer's help request. The administrator 114 is able to see this communication, which allows the administrator 114 to monitor and manage help sessions.

If an open help session has not been answered by an expert 112 or group of experts and is stilled queued, an administrator 114 has the option of sending the particular open help session to an expert 112. The administrator 114 can also requeue an open help session if the administrator 114 determines, based on the conversation, (which can be instant messages, test messages, or a phone conversation) that the current expert 112 is unable to help the operator 110. Furthermore, if the administrator 114 is a "super-expert" of happens to know the answer to the customer help request, the administrator 114 can participate in the current conversation between the operator 110 and expert 112. The administrator 114 can (but is not limited to) join the call between the operator 110 and expert 112 or group of experts, participate in the instant message session, and send files or links to prior help sessions with relevant data. An administrator 114 can also stop a current session between an operator 110 and an expert(s) 112 or further annotate the conversation with additional categories based on the context of the conversation.

It should be noted that the user interface 128 is not limited to the example of FIG. 4. For example, instead of or in addition to open sessions, the user interface 128 can also show past help sessions that can provide answers to current help session questions. The user interface 128 can also show the duration of current sessions between operators 110 and experts 112 so that if a conversation has extended past a given threshold, the administrator 114 can intervene. Also, if an administrator 114 selects a particular operator 110, a list of past, current, and/or backlogged help sessions associated with the selected operator 110 is displayed.

Figure 5:
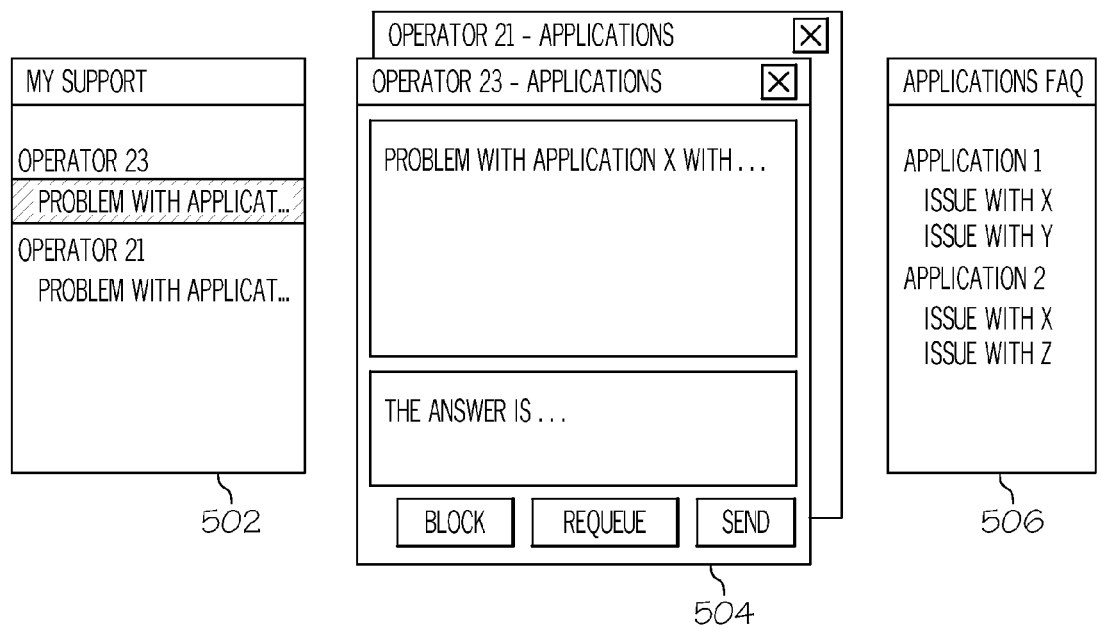
FIG. 5 is a block diagram illustrating a session manager user interface for expert support staff in a customer service environment according to one embodiment of the present invention.

FIG. 5 shows the session manager user interface 124 for an expert 112. As discussed above, an expert 112 can be associated with one or more help session categories such as (but not limited to) "Applications", "Software X", and "Hardware. FIG. 5 shows the user interface 124 comprising support queue window 502, a help session window 504, and a support database window 506. It should be noted that the expert session manager user interface 124 is not limited to the configuration of FIG. 5. When an operator 110 queues a help session for expert support, the session manager 118 can either place the help session into the appropriate queue 130 for manual selection by an expert 112 or automatically send the operator support request to the appropriate expert. For example, the information processing system 116 maintains a list of all experts and their associated categories. The session manager 118 can then route the operator support request to the appropriate expert(s) 112.

The support queue window 502 presents to the expert 112 all of the operator support requests associated with the expert 112. It should be noted that the customer service center 108 can be configured to let a customer provide enough detail to allow the session manager 118 to send the customer's help request directly to an expert 112 as compared to first routing the request to an operator 110. The help session window 504 allows the expert 112 to communicate with an operator 110 to further assist in trouble shooting a customer's help request. As discussed above, the conversation can be monitored by an administrator 114.

The expert 112 has the option of (but not limited to) blocking operator support requests, requeuing a current help session if he/she is unable to assist the operator 110, and sending the current operator support session to another expert(s). The support database window 506 provides an interface to a support database for assisting the operator or customer with the current help request.

As can be seen from the above discussion, the various embodiments of the present invention provide an advantageous system for organizing and monitoring customer help sessions based on categories associated with the help sessions. The various embodiments can automatically assign and/or allow an operator to assign categories to a help session based on the context of the help session. These categories are used to place help sessions in appropriate queues for expert help support review. An expert is able to be automatically sent operator help session support requests based on the category or categories assigned to the help session support request and associated with the expert. The various embodiment also allow an administrator to manage and monitor the various help sessions between an operator and an expert to further provide an efficient and advantageous customer support service.

Information Processing System

Figure 6:
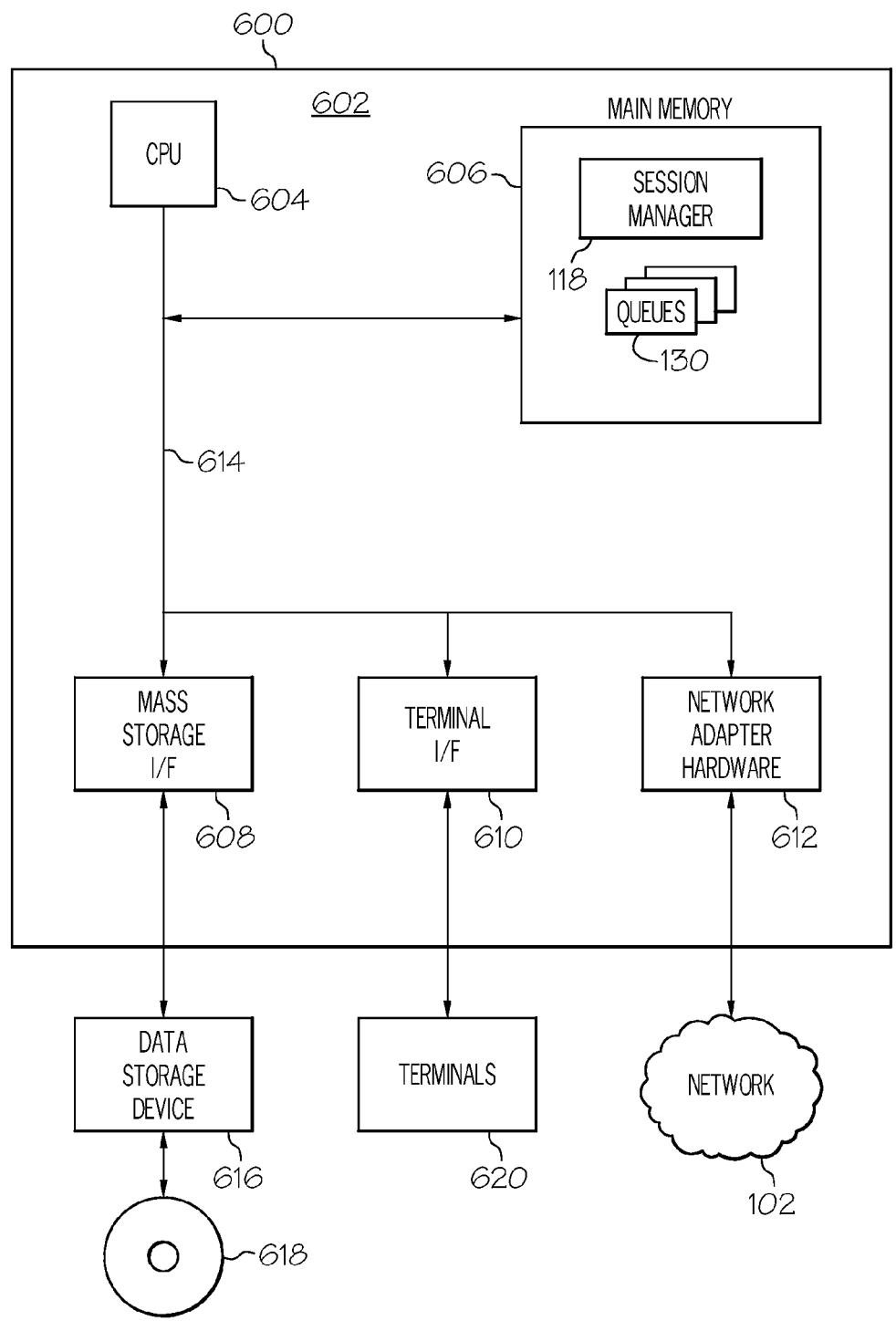
FIG. 6 is a block diagram illustrating a detailed view of an information processing system according to one embodiment of the present invention.

FIG. 6 is a block diagram illustrating a detailed view of an information processing system 600 such as the information processing system 116, according to one embodiment of the present invention. It should be noted that the following discussion is also applicable to the information processing systems of the operators 110, experts 112, and the administrators 114. The information processing system 600 is based upon a suitably configured processing system adapted to implement one embodiment of the present invention. Any suitably configured processing system is similarly able to be used as the information processing system 600 by various embodiments of the present invention such as a personal computer, workstation, or the like.

The information processing system 600 includes a computer 602. The computer 602 has a processor 604 that is connected to a main memory 606, mass storage interface 608, terminal interface 610, and network adapter hardware 612. A system bus 614 interconnects these system components. The mass storage interface 608 is used to connect mass storage devices, such as data storage device 616, to the information processing system 600 system. One specific type of data storage device is a computer readable medium such as a floppy disk drive, which may be used to store data to and read data from a CD 618 or a floppy diskette (not shown). Another type of data storage device is a data storage device configured to support, for example, NTFS type file system operations.

The main memory 606, in one embodiment, comprises the session manager 118 and the queues 130. It should be noted that with respect to the operators 110, the memory 606 can comprise that session console 120. With respect to the experts 112 and administrators 114 the memory 606 can comprise the session manager client 120, 126 and the session manager user interface 124, 128. Although illustrated as concurrently resident in the main memory 606, it is clear that respective components of the main memory 606 are not required to be completely resident in the main memory 606 at all times or even at the same time. In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and data storage device 616. Note that the term "computer system memory" is used herein to generically refer to the entire virtual memory of the information processing system 600.

Although only one CPU 604 is illustrated for computer 602, computer systems with multiple CPUs can be used equally effectively. Various embodiments of the present invention further incorporate interfaces that each includes separate, fully programmed microprocessors that are used to off-load processing from the CPU 604. Terminal interface 610 is used to directly connect one or more terminals 620 to computer 602 to provide a user interface to the computer 602. These terminals 620, which are able to be non-intelligent or fully programmable workstations, are used to allow system administrators and users to communicate with the information processing system 600. The terminal 620 is also able to consist of user interface and peripheral devices that are connected to computer 602 and controlled by terminal interface hardware included in the terminal I/F 610 that includes video adapters and interfaces for keyboards, pointing devices, and other interfaces and devices.

An operating system (not shown) included in the main memory is a suitable multitasking operating system such as the Linux, UNIX, Windows XP, and Windows Server 2001 operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 600. The network adapter hardware 612 is used to provide an interface to a network 102. Some embodiments of the present invention are able to be adapted to work with any data communications connections including present day analog and/or digital techniques or via a future networking mechanism.

Although one of the embodiments of the present invention is discussed in the context of a fully functional computer system, those skilled in the art will appreciate that various embodiments are capable of being distributed as a program product via CD or DVD, e.g. CD 618, CD ROM, or other form of recordable media, or via any type of electronic transmission mechanism.

Process of Categorizing Help Session Requests

Figure 7:
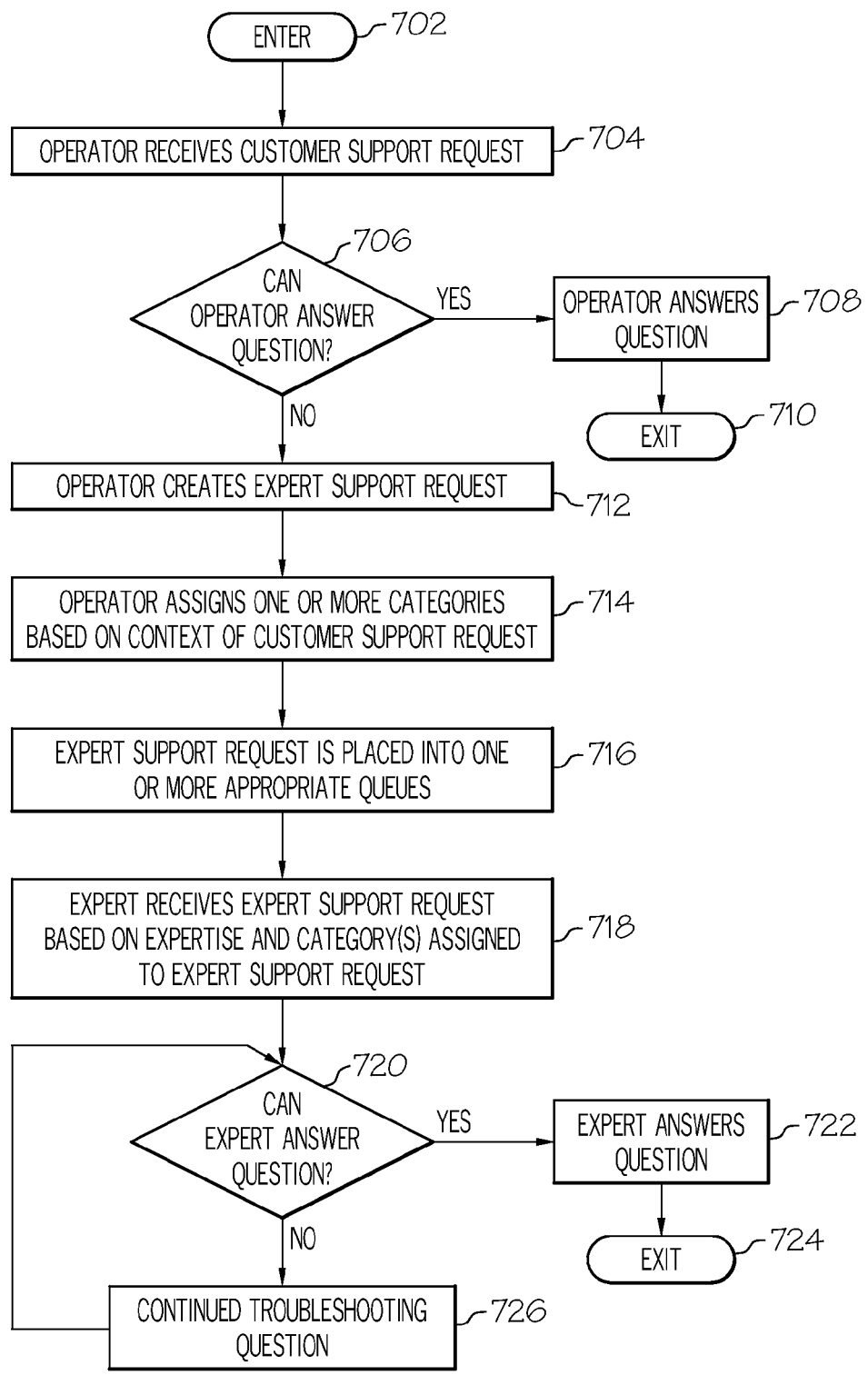
FIG. 7 is an operational flow diagram illustrating a process of organizing help sessions between a customer and an operator based on categories associated with the help sessions according to one embodiment of the present invention.

FIG. 7 is an operational flow diagram illustrating a process categorizing a help session request received by an operator 110 from customer 104 based on the context of the request. The operational flow diagram of FIG. 7 begins at step 702 and flows directly to step 704. An operator 110, at step 704, receives a customer service help request from a customer 104. The operator 110, at step 706, determines if he/she can answer the customer's question of solve the customer's problem. If the result of this determination is positive, the operator 110, at step 708, answers the question or solves the problem. The control flow exits at step 710. If the result of this determination is negative, the operator 110 via the session console 120, at step 712, creates an expert support request.

The operator 110 via the session console 120, at step 714, assigns one or more categories to the expert support request based on the context of the customer's help request. The session manager 118, at step 716, places the expert support request into one or more queues 130 based on the category(s) assigned to the expert support request. An expert 112, at step 718, reviews the expert support request to provide support to the operator 110. As discussed above, the session manager 118 can automatically send expert support request to appropriate experts 112 or an expert 122 can pull expert support requests from the queues 130. The expert 112, at step 720, determines if he/she can help the operator 110. If the result of this determination is positive, the expert 112, at step 722, helps the operator 110. The control flow then exits at step 724. If the result of this determination is negative, the expert 112 and operator 110 further troubleshoot the customer's question and/or problem. The expert support request can also be sent to another expert or requeued. The control flow returns to step 720.

Process of Managing and Monitoring Help Session Requests

Figure 8:
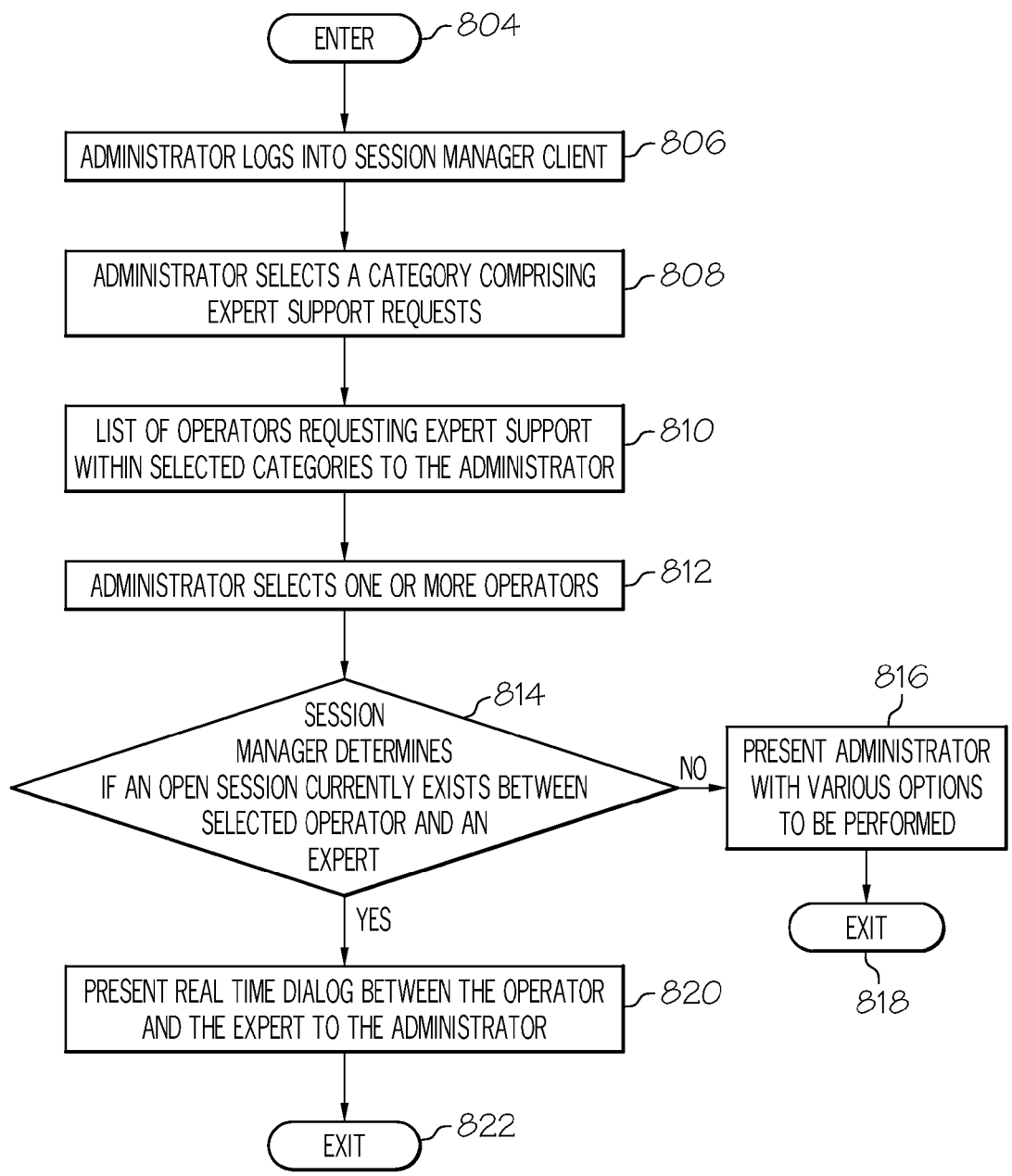
FIG. 8 is an operational flow diagram illustrating a process of monitoring help sessions between an operator and an expert based on categories associated with the help sessions according to one embodiment of the present invention.

FIG. 8 is an operational flow diagram illustrating a process of managing and monitoring expert support requests based on categories assigned to the expert support requests. The operational flow diagram of FIG. 8 begins at step 802 and flows directly to step 804. An administrator 114, at step 804, logs into the session manager client 126. A list of support categories, at step 806, is provided to the administrator 114 via the session manager user interface 128. The administrator 114 via the user interface 128, at step 808, selects a category that indicates expert support requests exits within that particular category.

A list of operator identifiers, at step 810, is presented to the administrator 114 for the selected category that is associated with expert support requests within the selected category. The administrator 114, at step 812, selects an operator identifier. The session manager 118, at step 814, determines if a current session is open between an operator 110 associated with the selected operator identifier and an expert(s) 114. If the result of this determination is negative, the administrator 114, at step 816, is provided with the options such as (but not limited to) requeuing the expert support request, answering the expert support request, sending the expert support request to a user. The control flow then exits at step 818.

If the result of the determination is positive, the administrator 114, at step 820, is presented with real-time dialog of the conversation between the operator 110 and the expert 112. The administrator 114 is able to monitor the conversation and can cancel the conversation, participate in the conversation, provide support to the conversation, and perform other actions with respect to the conversation. The control flow then exits at step 822.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a customer support environment, for monitoring and organizing customer support sessions based on categories, the method comprising:
    receiving, by at least one information processing system associated with at least one first level customer support agent, a help request from a customer;
    establishing, by the at least one information processing system, a support session with the customer based on the receiving;
    based on establishing the support session, monitoring the support session between the at least one first level customer support agent and the customer;
    receiving, by the at least one information processing system, an indication from the at least one first level customer support agent that a second level customer support agent is required to resolve the help request;
    parsing, by the at least one information processing system based on receiving the indication, a context of the support session, wherein the context of the support session comprises a communication between the customer and the at least one first level customer support agent, and wherein the indication is separate and distinct from the context of the support session;
    automatically assigning, by the at least one information processing system based on parsing the context of the support session, at least one support category to the support session based on a support context of the support session;
    associating, by the at least one information processing system, the support session with one or more annotations received from the at least one first level customer support agent, wherein the one or more annotations are viewable by at least one second level customer support agent associated with the at least one support category assigned to the support session; and
    placing, by the at least one information processing system, the support session into at least one support queue for selection by at least one second level customer support agent based on the at least one support category assigned to the support session.

2. The method of claim 1, further comprising:
    maintaining a database of second level customer support agents, wherein each second level customer support agent is associated with at least one support category.

3. The method of claim 2, further comprising:
    monitoring the at least one support queue; and
    automatically assigning the support session to at least one second level customer support agent, wherein the at least one support category assigned to the support session substantially matches the at least one support category assigned to the at least one second level customer support agent.

4. The method of claim 1, wherein the support session comprises at least one of:
    an instant messaging session between the at least one first level customer support agent and the customer; and
    a voice call between the at least one first level customer support agent and the customer.

5. A computer program product for monitoring and organizing customer support sessions based on categories, the computer program product comprising:
    a non-transitory storage medium readable by a processing circuit and storing instructions for execution by the processing circuit for performing a method comprising:
        receiving, by at least one information processing system associated with at least one first level customer support agent, a help request from a customer;
        establishing, by the at least one information processing system, a support session with the customer based on the receiving;
        based on establishing the support session, monitoring the support session between the at least one first level customer support agent and the customer;
        receiving, by the at least one information processing system, an indication from the at least one first level customer support agent that a second level customer support agent is required to resolve the help request;
        parsing, by the at least one information processing system based on receiving the indication, a context of the support session, wherein the context of the support session comprises a communication between the customer and the at least one first level customer support agent, and wherein the indication is separate and distinct from the context of the support session;
        automatically assigning, by the at least one information processing system based on parsing the context of the support session, at least one support category to the support session based on a support context of the support session;
        associating, by the at least one information processing system, the support session with one or more annotations received from the at least one first level customer support agent, wherein the one or more annotations are viewable by at least one second level customer support agent associated with the at least one support category assigned to the support session; and
        placing, by the at least one information processing system, the support session into at least one support queue for selection by at least one second level customer support agent based on the at least one support category assigned to the support session.

6. The computer program product of claim 5, wherein the method further comprises:
maintaining a database of second level customer support agents, wherein each second level customer support agent is associated with at least one support category.

7. The computer program product of claim 6, wherein the method further comprises:
monitoring the at least one support queue; and
automatically assigning the support session to at least one second level customer support agent, wherein the at least one support category assigned to the support session substantially matches the at least one support category assigned to the at least one second level customer support agent.

8. The method of claim 5, wherein the support session comprises at least one of:
an instant messaging session between the at least one first level customer support agent and the customer; and
a voice call between the at least one first level customer support agent and the customer.

\* \* \* \* \*